United States Patent
Nilsson

(10) Patent No.: US 6,971,330 B2
(45) Date of Patent: Dec. 6, 2005

(54) METHOD OF AND AN APPARATUS FOR SOMATIC CELL COUNT

(75) Inventor: Jan Ove Nilsson, Taby (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/479,461

(22) PCT Filed: Jun. 14, 2002

(86) PCT No.: PCT/SE02/01159

§ 371 (c)(1),
(2), (4) Date: Dec. 2, 2003

(87) PCT Pub. No.: WO03/001904

PCT Pub. Date: Jan. 9, 2003

(65) Prior Publication Data

US 2004/0168643 A1    Sep. 2, 2004

(30) Foreign Application Priority Data

Jun. 27, 2001 (SE) .................................... 0102291

(51) Int. Cl.[7] ............................................. A01J 5/013
(52) U.S. Cl. ................................................. 119/14.02
(58) Field of Search .......................... 119/14.02, 14.14, 119/14.17, 14.18

(56) References Cited

U.S. PATENT DOCUMENTS

| | | | |
|---|---|---|---|
| 4,325,028 A | * | 4/1982 | Takahashi .................. 324/442 |
| 5,704,311 A | * | 1/1998 | van den Berg .......... 119/14.02 |
| 5,865,138 A | * | 2/1999 | van der Lely ........... 119/14.02 |
| 6,038,030 A | * | 3/2000 | van den Berg ............. 356/425 |
| 6,307,362 B1 | * | 10/2001 | Mangan ..................... 324/71.4 |
| 6,378,455 B1 | * | 4/2002 | Postma et al. ........... 119/14.08 |
| 6,493,071 B2 | * | 12/2002 | van den Berg et al. ....... 356/72 |
| 6,694,830 B2 | * | 2/2004 | Hakes ..................... 73/863.53 |

FOREIGN PATENT DOCUMENTS

| | | | |
|---|---|---|---|
| DE | 4007327 | 7/1991 | |
| EP | 0 211 386 | 2/1987 | |
| EP | 0 628 244 | 12/1994 | ............. H01J 9/00 |
| EP | 0 713 641 | 5/1996 | ........... H01J 5/017 |
| EP | 0 981 954 | 1/2000 | |
| SE | 515127 | 6/2001 | |

* cited by examiner

*Primary Examiner*—Teri Pham Luu
*Assistant Examiner*—Kimberly S. Smith
(74) *Attorney, Agent, or Firm*—Young & Thompson

(57) ABSTRACT

Method of somatic cell count in milk from animals, and an apparatus therefore enabling individual somatic cell count for milk from each teat, i.e. udder quarter, by connecting a teatcup to a first teat, taking a sample of the total milk for the first teat when the flow of milk from the first teat exceeds a predefined value, connecting a the to at least one further teat, taking a sample of the total milk for said first and at least one further teat when the flow of milk from the first and further teats exceeds a predefined value, and calculating the estimated somatic cell count (SCC2, SCC3, SCC4) for the milk from the further teats.

15 Claims, 2 Drawing Sheets

US 6,971,330 B2

METHOD OF AND AN APPARATUS FOR SOMATIC CELL COUNT

TECHNICAL FIELD OF THE INVENTION

Figure 1:
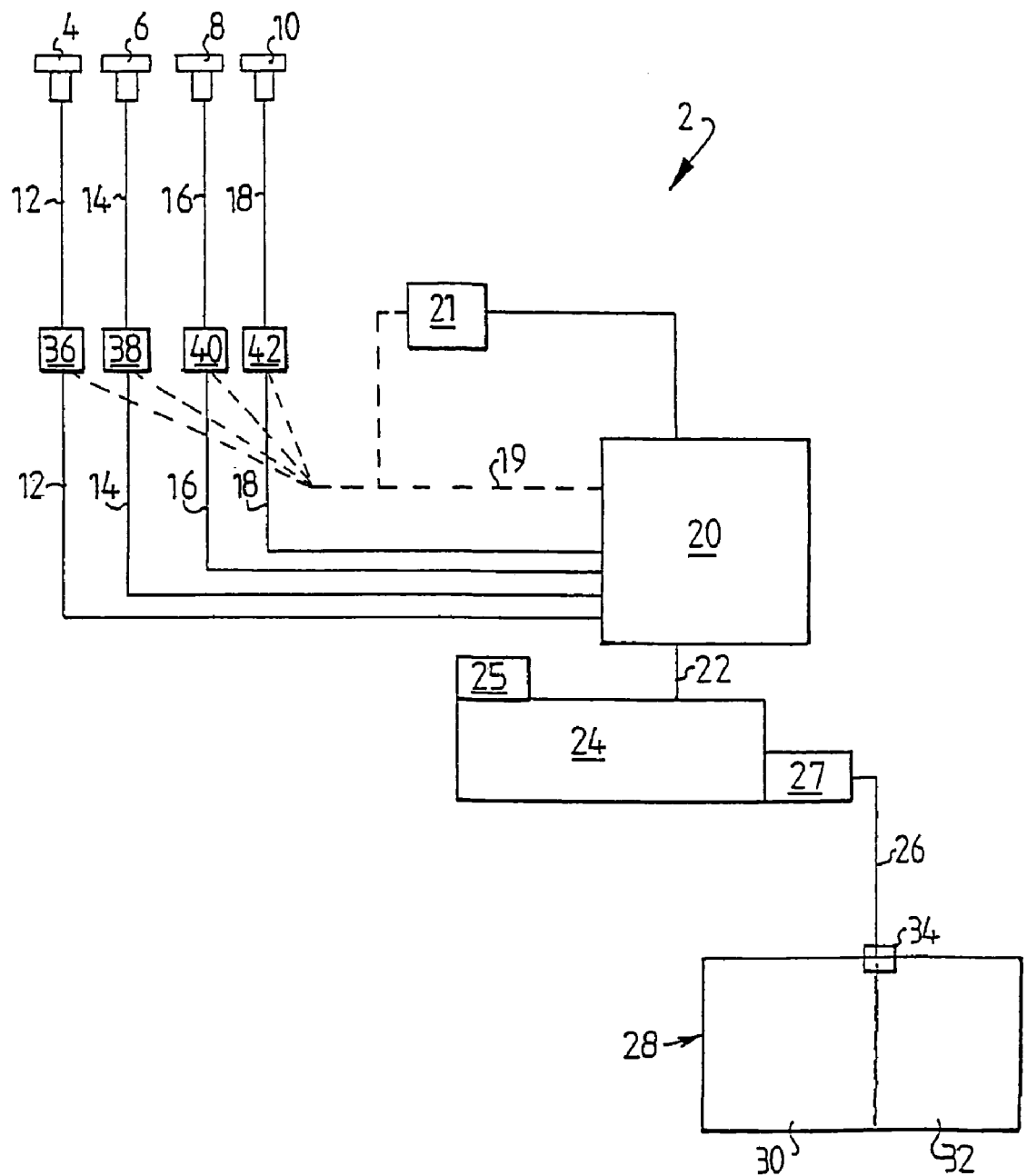

The present invention relates to a method of somatic cell count in milk from animals, and an apparatus therefore.

BACKGROUND OF THE INVENTION

Somatic cells are animal body cells. Somatic cells comprise both leukocytes, i.e. white blood cells, and epithelial cells. The leukocytes are a natural defence mechanism for fighting infection in an animal, whereas the epithelial cells are cells from the udder secretory tissue that are shed and renewed as a part of the animals normal body functions.

Somatic cell counts are based on the number of cells per millilitre, ml, of milk. The majority of the cells in a somatic cell count are leukocytes. A low level of leukocytes in milk indicates that the animal is healthy and that the milk is normal. A high level of leukocytes in milk indicates that the animal is unhealthy and that the milk is abnormal. Therefore, somatic cell count can be used as a measure of milk quality. Generally, a somatic cell count level exceeding 250,000–300,000 per ml indicates abnormal milk in a cow. It is of course possible to use other limit values depending e.g. on the specific animal, restrictions set by the recipient of the milk, e.g. a dairy or the type of animal, e.g. cow, goat, sheep or buffalo.

Elevated somatic cell count levels may result from several factors or a combination of these, but a somatic cell count value exceeding 250,000–300,000 per ml in milk from a cow is nearly always an indication of mastitis, a bacterial infection of the mammary gland.

EP 0 628 244 A1 shows a method of milking animals, where the milk can be collected after separation in dependence on the somatic cell count of the milk. At least one measuring element is provided for establishing the somatic cell count of the milk. One measuring element may be incorporated in the collecting glass. Consequently, the milk is checked in the collecting glass as to the somatic cell count. As a result of the check in the collecting glass, the milk is directed to a first or a second compartment in a milk tank. Alternatively, one measuring element may be arranged for each one of the milk tubes arranged between a teat and the milk tank. Consequently, the milk is checked in each of the milk tubes as to the somatic cell count. As a result of the check in each milk tube, the milk is directed to a first or a second compartment in a milk tank. Alternatively, one measuring element may be arranged between a milking claw in which the tubes of the teat cups are joined together and the milk tank. Consequently, the milk is checked there as to the somatic cell count. As a result of the check there, the milk is directed to a first or a second compartment in a milk tank.

According to EP 0 628 244 A1, it is only possible to check the individual somatic cell count for each teat by arranging one measuring element per teat, e.g. for a cow four somatic cell count measuring elements in total would be needed.

OBJECT OF THE INVENTION

An object of the present invention is to refine a method of somatic cell count in milk from animals, and an apparatus therefore, enabling individual somatic cell count for milk from each teat, and its corresponding udder portion, by taking somatic cell count samples of the total milk, i.e. the milk from those teats that are being milked at a specific moment.

SUMMARY OF THE INVENTION

This object of the present invention is achieved by a method of somatic cell count in quarter milking systems comprising the steps of measuring flow quantity of milk for each teat separately, and the somatic cell count for the total milk, and an apparatus therefore.

The method and the apparatus according to the invention have the following advantages: By the combination of the step of measuring flow quantity of milk from each teat separately, and the somatic cell count for the total milk, only one somatic cell counter is needed to receive individual estimated somatic cell counts for each teat and corresponding udder portion.

DRAWING SUMMARY

Figure 2:
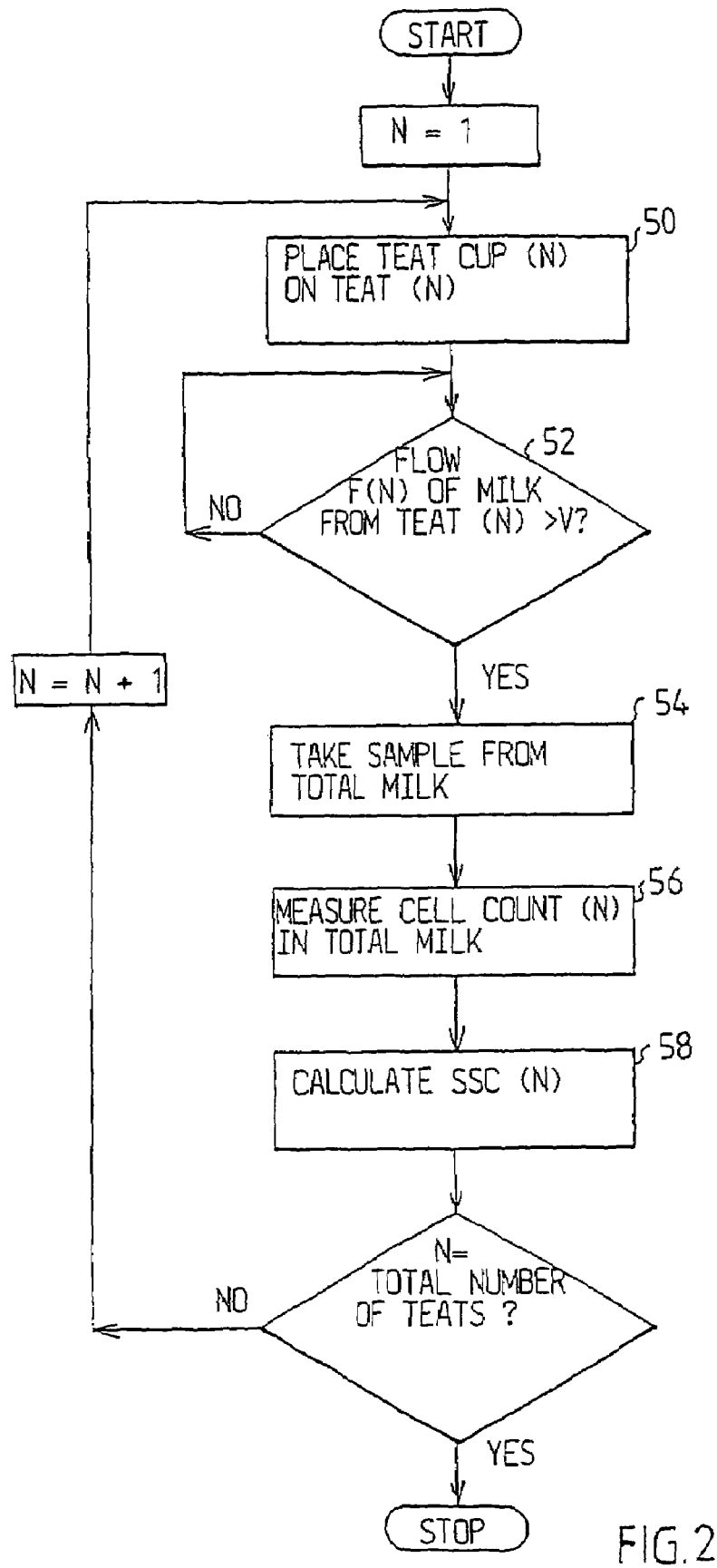

The invention will be described in more detail below with reference to the accompanying drawings, wherein:

FIG. 1 shows schematically a milking installation according to the invention, and FIG. 2 shows schematically a flow chart of the method according to the invention.

DETAILED DESCRIPTION

In the following description, for purposes of explanation and not limitation, specific details are set forth in order to provide a thorough understanding of the present invention. However, it will be apparent to those skilled in the art that the present invention may be practised in embodiments that depart from these specific details. In other instances, detailed descriptions of well-known devices and methods are omitted so as not to obscure the description of the present invention with unnecessary details.

FIG. 1 shows schematically a milking apparatus 2 for automatically milking animals, the milking apparatus 2 comprising four teat cups 4, 6, 8, 10. With the aid of a milking robot arm (not shown) the teat cups 4, 6, 8, 10 can automatically be connected to the teats of an animal. The milk obtained per udder quarter is supplied through separate milk lines 12, 14, 16, 18 to a milk meter 20. The separate milk lines 12, 14, 16, 18 may optionally be connected to one milk line 19 which in turn is connected to the milk meter 20. A somatic cell counter 21, e.g. using optical counting of somatic cells, is connected to the milk meter 20 or optionally to the optional milk line 19 arranged between the separate milk lines 12, 14, 16, 18 and the milk meter 20. Thus, a milk sample taken by the somatic cell counter 21 is taken from the total milk. The discharge line 22 from the milk meter 20 extends into a milk receiver 24. A vacuum source 25 for creating vacuum in the teat cups is connected to the milk receiver 24. The milk receiver is also connected via a milk pump 27 to a milk line 26 extending into a milk tank 28. The milking apparatus 2 is installed in a milking station (not shown). Said milking station comprises said milking apparatus 2, a robot arm adapted for automatically connecting said teat cups (4, 6. 8, 10) to said teats, a gate section comprising an entry gate and an exit gate for control of the animal traffic through the milking station, suitably a feeding module comprising an adjustable manger, and a control system for control of the milking station.

The milk tank 28 has two compartments 30, 32. The first compartment 30 is arranged for normal milk and the second compartment 32 is arranged for abnormal milk. It is also possible to arrange two separate milk tanks (not shown) having the same function as the milk tank 28 with two separate compartments 30, 32. It is also possible to dispose of the abnormal milk directly to a drain. A valve 34 is connected to the milk line 26 extending into the milk tank 28. Depending on the position of the valve 34, the milk is discharged into one of the two separate compartments 30, 32 of the milk tank 28.

Each milk line 12, 14, 16, 18 extending from the teat cups 4, 6, 8, 10 to the milk meter 20 comprises one milk flow quantity sensor 36, 38, 40, 42, e.g. of the type using infra-red light technology, e.g. the DeLaval flow indicator F15.

FIG. 2 shows the method of somatic cell count in quarter milking systems according to the present invention. The method of somatic cell count estimation in quarter milking according to the invention comprises the steps of sucking out the milk from each teat by vacuum, measuring flow quantity of milk for each teat individually using the milk flow quantity sensors 36, 38, 40, 42, and measuring the somatic cell count in the total milk. The reference signs indicating milk flow and somatic cell count, i.e. F1, F2, F3, F4 and SCC1, SCC2, SCC3, SCC4 respectively, are used in the formulas below for calculating the somatic cell count for each teat.

Firstly, a teat cup 4 is connected to a first teat 50. When the flow F1 of milk from said first teat exceeds a predefined value v 52, a sample, e.g. 40 ml, of the total milk from the first teat is taken 54, and the somatic cell count C1 for the total milk from the first teat is measured 56. In this case when only the first teat cup is placed on the first teat, the total milk equals the milk from the first teat resulting in that the somatic cell count C1 for the total milk equals the true somatic cell count SCC1 for the milk from the first teat.

Secondly, a teat cup 6 is connected to a second teat 50, and a sample, e.g. 40 ml, of the total milk from said first and second teat is taken 54 when the flow F1, F2 of milk from each of said first and second teat exceeds a predefined value v 52. In this case when both the first teat cup is placed on the first teat and the second teat cup is placed on the second teat, the total milk equals the collective milk from the first and second teat. The somatic cell count C2 for the total milk from the first and second teat is measured 56, and the estimated somatic cell count SCC2 for the milk from said second teat is calculated 58 using the formula:

$$C2=(SCC1 \times F1+SCC2 \times F2)/(F1+F2), \text{ i.e.}$$

$$SCC2=((C2 \times (F1+F2))-(SCC1 \times F1))/F2.$$

Thirdly, a teat cup 8 is connected to a third teat 50, and a sample, e.g. 40 ml, of the total milk from said first, second and third teat is taken 54 when the flow F1, F2, F3 of milk from each of said first, second and third teat exceeds a predefined value v 52. In this case when the first teat cup is placed on the first teat, the second teat cup is placed on the second teat, and the third teat cup is placed on the third teat, the total milk equals the collective milk from the first, second and third teat. The somatic cell count C3 for the total milk from the first, second and third teat is measured 56, and the estimated somatic cell count SCC3 for the milk from said third teat is calculated 58 using the formula:

$$C3=(SCC1 \times F1+SCC2 \times F2+SCC2 \times F3)/(F1+F2+F3),$$
i.e.

$$SCC3=((C3 \times (F1+F2+F3))-(SCC1 \times F3+SCC2 \times F2))/F3.$$

Fourthly, a teat cup (10) is connected to a fourth teat 50, a sample, e.g. 40 ml, of the total milk for said first, second, third and a fourth teat is taken 54 when the flow F1, F2, F3, F4 of milk from each of said first, second, third and fourth teat exceeds a pre-defined value v 52. In this case when the first teat cup is placed on the first teat, the second teat cup is placed on the second teat, the third teat cup is placed on the third teat, and the fourth teat cup is placed on the fourth teat, the total milk equals the collective milk from the first, second, third and fourth teat. The somatic cell count C4 for the total milk from the first, second, third and fourth teat is measured 56, and the estimated somatic cell count SCC4 for the milk from said fourth teat is calculated 58 using the formula:

$$C4=(SCC1 \times F1+SCC2 \times F2+SCC3 \times F3+SCC4 \times F4)/(F1+F2+F3+F4), \text{i.e.}$$

$$SCC4=((C4 \times (F1+F2+F3+F4))-(SCC1 \times F1+SCC2 \times F2+SCC3 \times F3))/F4.$$

The accuracy in the estimated somatic cell counts SCC2, SCC3 and SCC4 is in this embodiment is high using the fact that the milk flow quantity sensors give the quantity of the milk flow F1, F2, F3 and F4 from each teat at any given time. The relations between these milk flow quantities are used to compensate for the dilution effects resulting from different milk flow quantities from each teat at a given time.

The accuracy can be even more improved using the possibility given when the milk flow from a teat decreases and reaches zero at the end of a milking as can be seen below.

In one embodiment of the invention, a further sample of the total milk from said teats is taken when all teats are being milked. Thereafter the somatic cell counts C1, C2, C3, C4 for the total milk from said teats is measured. When the flow F1, F2, F3, F4 of milk from one of said teats falls below a predefined value v', the teat cup 4, 6, 8, 10 for said one teat is disconnected from said one teat whereafter the next sample of the total milk is taken. This is repeated until all teat cups are disconnected, and thereafter the estimated somatic cell count SCC2', SCC3', SCC4', for the milk from said teats are calculated using the formulas above. Thereafter the mean value for the somatic cell count for each teat may be calculated, e.g.

$$SCC2\text{mean}=(SCC2+SCC2')/2.$$

In a further embodiment of the invention, a sample of the total milk from said teats is taken when all teats are being milked. Thereafter the somatic cell counts C1, C2, C3, C4 for the total milk from said teats is measured. When the flow F1, F2, F3, F4 of milk from one of said teats falls below a predefined value v', the teat cup 4, 6, 8, 10 for said one teat is disconnected from said one teat, whereafter the next sample of the total milk is taken. This is repeated until all teat cups are disconnected, and thereafter the estimated somatic cell count SCC2, SCC3, SCC4 for the milk from said teats is calculated using the formulas above.

In another embodiment using a simplified method of estimating somatic cell counts the approximation is made that the milk flow from the teats being milked at any given time is the same from each teat In this way the calculations above are simplified $$C2=(SCC1+SCC2)/2, \text{ i.e. } SCC2=2 \times C2-SCC1.$$

Accordingly $SCC3=3 \times C3-SCC1-SCC\ 2$ and $SCC4=4 \times C4-SCC-SCC\ 2-SCC3$ The method according to the invention is applicable when at least two teats are being milked. Preferably, all samples of the total milk may be taken with the same somatic cell counter 21. All samples of the total milk may for example be taken from a milk meter 20 or a milk line 19. The apparatus described herein may form part of a fully automated milking and cleansing system, in which use can be made of an automatic system for allowing animals, optionally on a selective basis, access to the milking station, an animal identification system, a teat cleaning system, a robot for automatically connecting the teat cups etc. The entire system may be controlled by a computer (not shown).

What is claimed is:

1. Method of somatic cell count estimation in quarter milking, characterised by, the steps of connecting a teat cup (4) to a first teat, taking a sample of the total milk from the first teat when the flow (F1) of milk from said first teat exceeds a predefined value (v), measuring the somatic cell count (C1) for the total milk from said first teat, connecting a teat cup (6, 8, 10) to a second teat, taking a sample of the total milk from said first and said second teat when the flow (F1, F2) of milk from each of said first and said second teat exceeds a predefined value (v), measuring the somatic cell count (C2) for the total milk from said first and said second teat, and calculating the estimated somatic cell count (SCC2) for the milk from said second teat.

2. Method of somatic cell count estimation in quarter milking according to claim 1, characterised by, the further steps of connecting a teat cup (8) to a third teat, taking a sample of the total milk from said first, said second and said third teat when the flow (F1, F2, F3) of milk from each of said first, second and third teat exceeds a predefined value (v), measuring the somatic cell count (C3) for the total milk from the first, second and third teat, and calculating the estimated somatic cell count (SCC3) for the milk from said third teat.

3. Method of somatic cell count estimation in quarter milking according to claim 2, characterised by, the further steps of connecting a teat cup (10) to a fourth teat, taking a sample of the total milk from said first, second, third and fourth teat when the flow (F1, F2, F3, F4) of milk from each of said first, second, third and fourth teat exceeds a predefined value (v), measuring the somatic cell count (C4) for the total milk from the first, second, third and fourth teat, and calculating the estimated somatic cell count (SCC4) for the milk from said fourth teat.

4. Method of somatic cell count estimation in quarter milking according to claim 2, characterised by, the further steps of: taking a sample of the total milk from said teats, measuring the somatic cell count (C1, C2, C3, C4) for the total milk from said teats, disconnecting the teat cup (4, 6, 8, 10) from said one teat, when the flow (F1, F2, F3, F4) of milk from one of the said teats fall below a predefined value (v'), repeating these further steps until all teat cups are disconnected, and thereafter calculating the estimated somatic cell count for the milk from said teats.

5. Method of somatic cell count estimation in quarter milking according to claim 3, characterised by, the further steps of: taking a sample of the total milk from said teats, measuring the somatic cell count (C1, C2, C3, C4) for the total milk from said teats, disconnecting the teat cup (4, 6, 8, 10) from one teat, when the flow (F1, F2, F3, F4) of milk from one of the said teats fall below a predefined value (v'), repeating these further steps until all teat cups are disconnected, and thereafter calculating the estimated somatic cell count for the milk from said teats.

6. Method of somatic cell count estimation in quarter milking according to claim 1, characterised by, the step of taking all samples of the total milk with the same somatic cell counter (21).

7. Method of somatic cell count estimation in quarter milking according to claim 1, characterised by, the step of taking all samples of the total milk from a milk meter (20).

8. Method of somatic cell count estimation in quarter milking according to claim 1, characterised by, the step of taking all samples of the total milk from a milk line (19).

9. Method of somatic cell count estimation in quarter milking according to claim 1, characterised by, the step of measuring the quantity of milk flow (F1, F2, F3, F4) from an udder portion using infrared light technology.

10. Method of somatic cell count estimation in quarter milking, characterised by, the steps of connecting a teat cup (4) to a first teat, connecting a teat cup (6, 8, 10) to at least one further teat, and the further steps of taking a sample of the total milk from said teats, measuring the somatic cell count (C1, C2, C3, C4) for the total milk from said teats, disconnecting the teat cup (4, 6, 8, 10) from one teat, when the flow (F1, F2, F3, F4) of milk from said one teat falls below a predefined value (v'), repeating these further steps until all teat cups are disconnected, and thereafter calculating the estimated somatic cell count (SCC2, SCC3, SCC4) for the milk from said teats.

11. Method of somatic cell count estimation in quarter milking according to claim 10, characterised by, the step of taking all samples of the total milk with the same somatic cell counter (21).

12. Method of somatic cell count estimation in quarter milking according to claim 10, characterised by, the step of taking all samples of the total milk from a milk meter (20).

13. Method of somatic cell count estimation in quarter milking according to claim 10, characterised by, the step of taking all samples of the total milk from a milk line (19).

14. Method of somatic cell count estimation in quarter milking according to claim 10, characterised by, the step of measuring the quantity of milk flow (F1, F2, F3, F4) from an udder portion using infrared light technology.

15. Method of somatic cell count estimation in quarter milking, comprising the steps in consecutive or reverse order of:
   (a) taking a sample of the total milk from n teats, where n=1, 2 or 3, and measuring the somatic cell count for the total milk from said n teats,
   (b) taking a sample of the total milk from n+1 teats, measuring the somatic cell count for the total milk from said n+1 teats, whereafter the estimated somatic cell count is calculated for the milk from the n+1th teat.

* * * * *